United States Patent
Wu

(10) Patent No.: US 7,033,021 B1
(45) Date of Patent: Apr. 25, 2006

(54) DEVICE FOR CONNECTING EYEGLASS FRAME AND TEMPLE OR HEADBAND

(76) Inventor: Wen-Hsuing Wu, No. 89, Jungluen, Anding Shiang, Tainan County (TW)

( * ) Notice: Subject to any disclaimer, the term of this patent is extended or adjusted under 35 U.S.C. 154(b) by 0 days.

(21) Appl. No.: 11/164,189

(22) Filed: Nov. 14, 2005

(51) Int. Cl.
*G02C 5/14* (2006.01)
*G02C 5/16* (2006.01)

(52) U.S. Cl. .................. 351/116; 351/111; 351/113

(58) Field of Classification Search .......... 351/111, 351/119, 121, 140; 2/448, 452
See application file for complete search history.

(56) References Cited

U.S. PATENT DOCUMENTS 5,652,637 A * 7/1997 Marini ................. 351/116
6,834,952 B1 * 12/2004 Polovin .................. 351/116

* cited by examiner

*Primary Examiner*—Timothy Thompson
*Assistant Examiner*—Jerry Fang
(74) *Attorney, Agent, or Firm*—Alan D. Kamrath; Nikolai & Mersereau, P.A.

(57) ABSTRACT

The present invention relates to a device for connecting an eyeglass frame and temples/headband. A pair of slots is provided at both endpieces of the frame for receiving a connecting device respectively, each slot having an opening at the bottom of and in communication with the slot and a projection at an edge of the opening; each connecting device having a buckle at the front dimensioned and shaped to fit snugly into the slot and having a bottom release tab, the rear end of each connecting device being secured to a temple/headband respectively by screwing.

2 Claims, 8 Drawing Sheets

DEVICE FOR CONNECTING EYEGLASS FRAME AND TEMPLE OR HEADBAND

BACKGROUND OF THE INVENTION

1. Field of Invention

The present invention relates to eyeglasses and more particularly to an improved and stable connecting device for an eyeglass frame and eyeglass temples or a headband which is performed by simply pressed.

2. Related Art

A conventional connecting device for an eyeglass frame 10 and eyeglass temples 30 or a headband 30' is shown in FIGS. 1 and 2. The frame 10 comprises a recess 101 having an opening 102 at its endpiece. Either connecting section 20 or 20' has a forward portion 201 with a connecting member 202 having a flexible projecting latch 203 fastened in the opening 102. A rear portion 204 of either connecting device 20 or 20' comprises a flange 205 having a pivot pin in one configuration (e.g., as an eyeglasses or sunglasses), as shown in FIG. 1, for pivotably connecting to the temple 30 or a bar 206 in another configuration (e.g., as an eyeglasses for leisure or sports), as shown in FIG. 2, with a headband 30' tied around.

Another conventional connecting device for an eyeglass frame 40 and eyeglass temples 60 or a headband 70 is shown in FIGS. 3 and 4. A connecting device 50 at an endpiece of the frame 40 has a slot 501 having an opening 502 at the outer side for connecting to a forward member 601 of the temple 60 or a forward member 701 of the headband 70. A latch 602 is formed on the forward member 601 and a latch 702 is formed in the forward member 701 respectively. The forward member 601 or 701 is inserted into the slot 501 and the latch 602 or 702 is secured to the opening 502 such that the temple 60 or the headband 70 and the frame 40 are secured together by the connecting device 50. A simpler assembly for exchanging temples or a headband fast is required.

SUMMARY OF THE INVENTION

It is therefore an object of the present invention to provide a device for connecting an eyeglass frame and temples/headband, wherein: a pair of slots is provided at both endpieces of the frame for receiving a connecting device respectively, each slot having an opening at the bottom of and in communication with the slot and a projection at an edge of the opening; each connecting device having a buckle at the front dimensioned and shaped to fit snugly into the slot and having a bottom release tab, the rear end of each connecting device being secured to a temple/headband respectively by screwing.

The above and other objects, features and advantages of the present invention will become apparent from the following detailed description taken with the accompanying drawings.

DETAILED DESCRIPTION OF THE INVENTION

Figure 1:
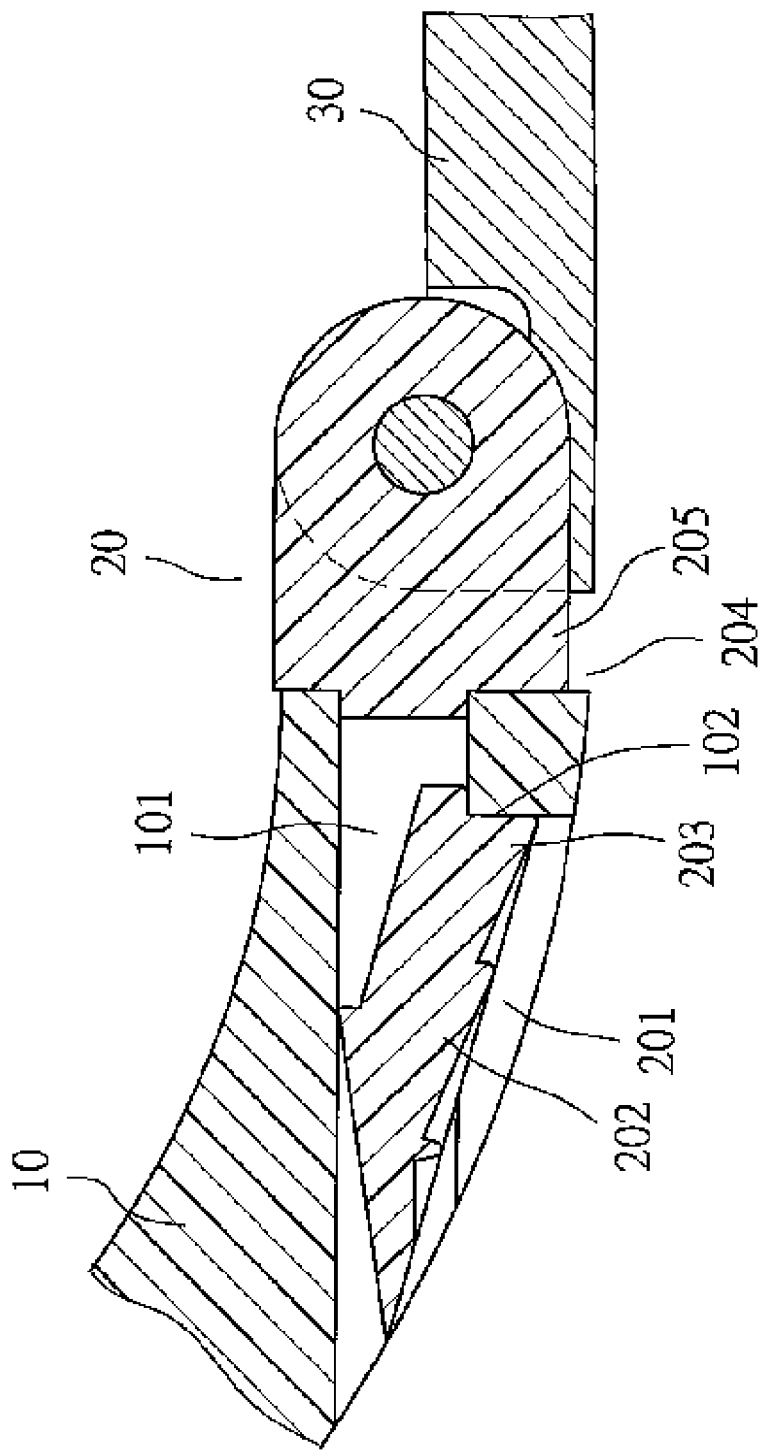
FIG. 1 is a sectional view of a conventional connecting device for eyeglass frame and temple.
Figure 2:
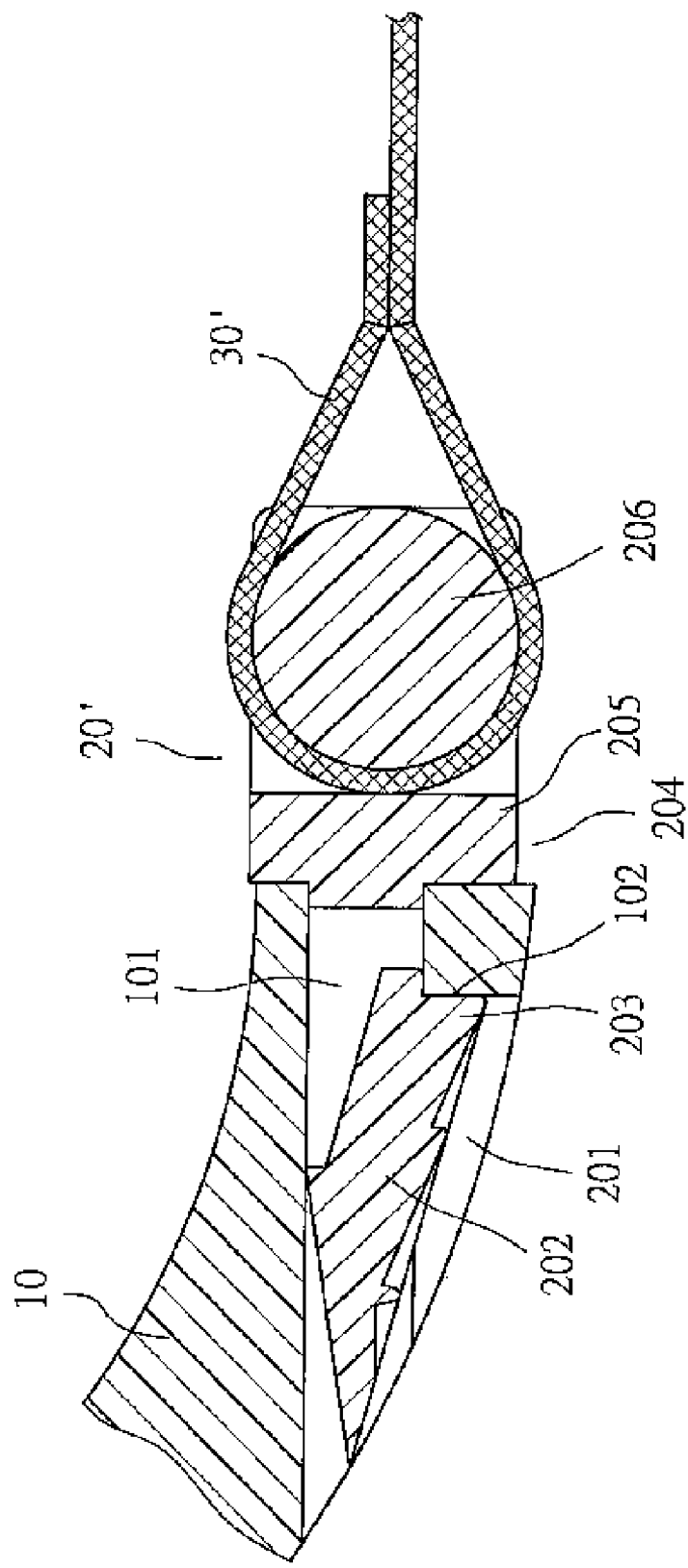
FIG. 2 is a sectional view of the conventional connecting device for eyeglass frame and headband.
Figure 3:
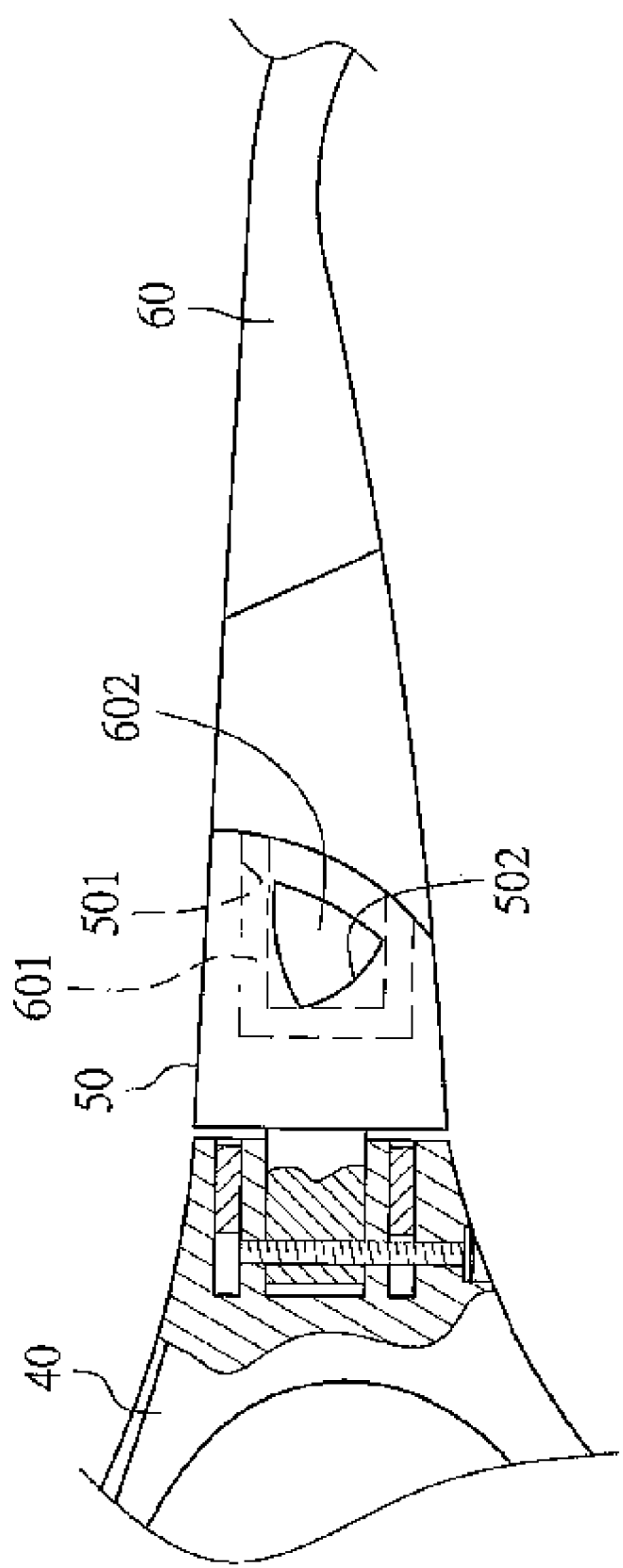
FIG. 3 is a sectional view of another conventional connecting device for eyeglass frame and temple.
Figure 4:
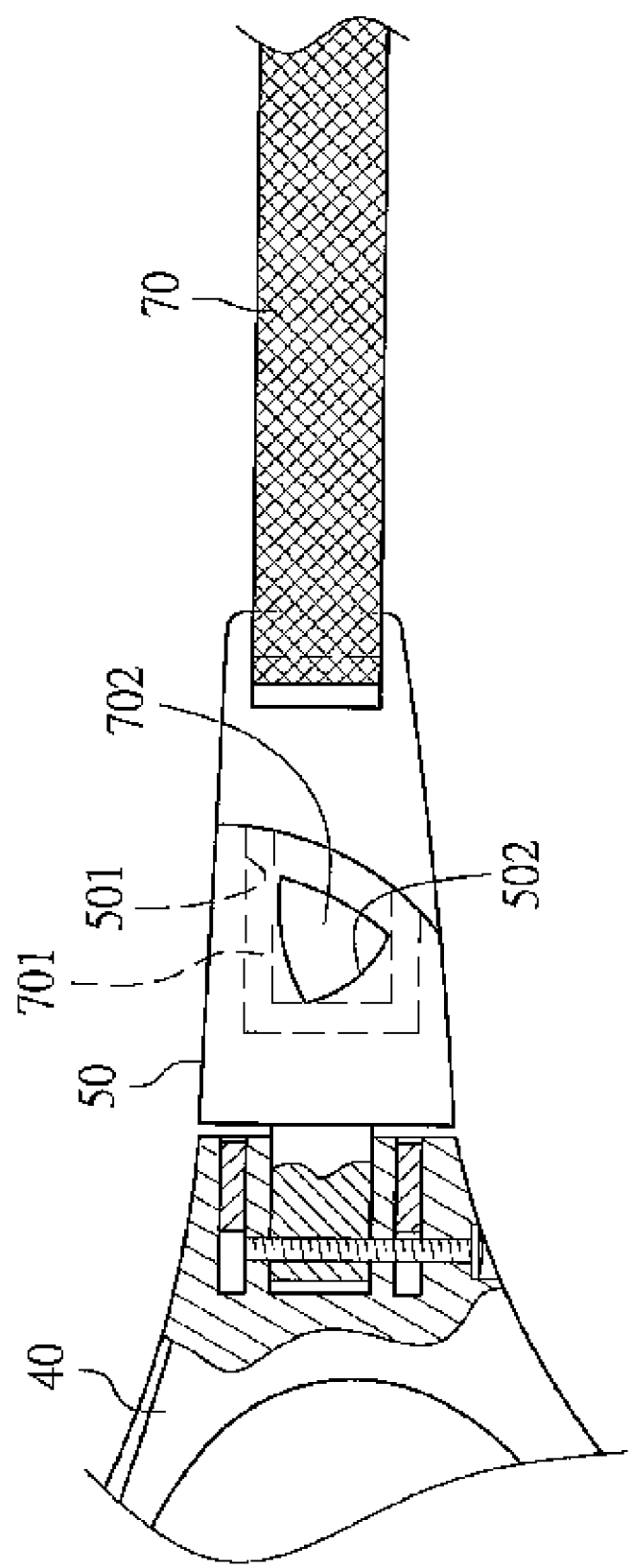
FIG. 4 is a sectional view of another conventional connecting device for eyeglass frame and headband.
Figure 5:
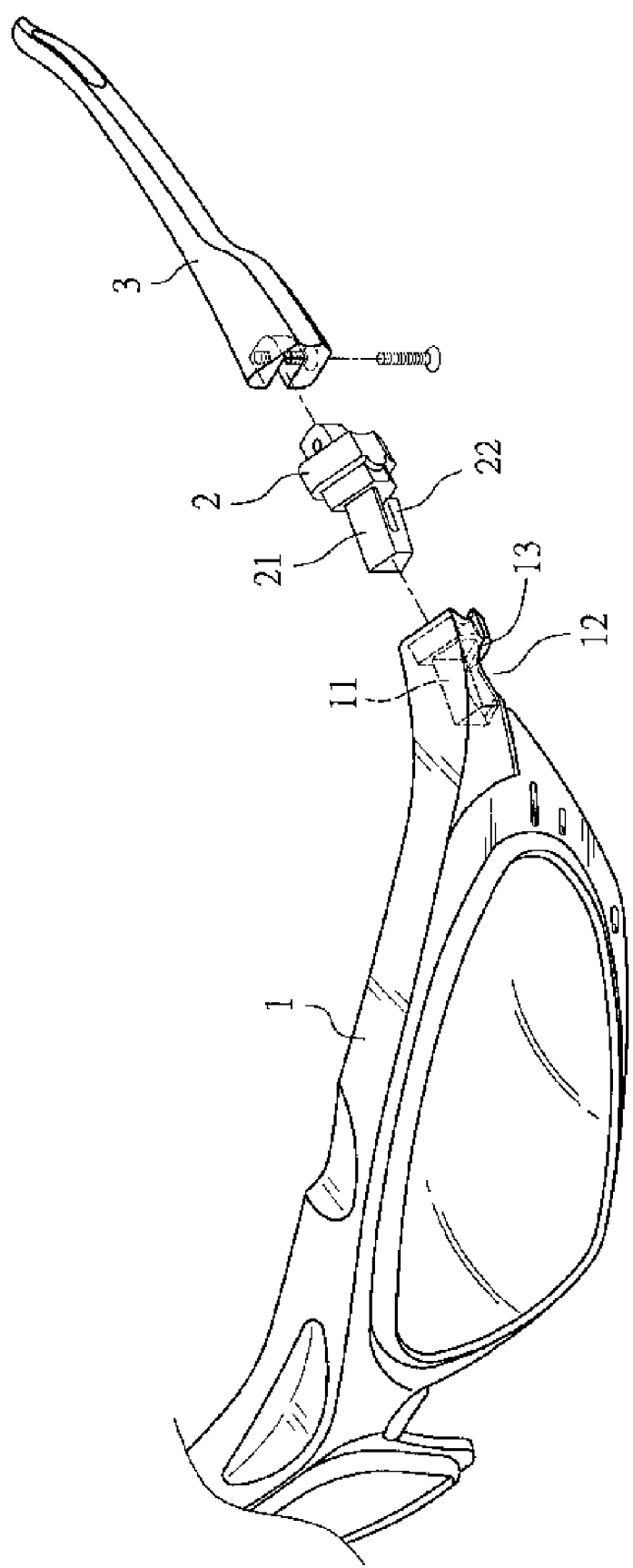
FIG. 5 is an exploded view of a preferred embodiment of connecting device for eyeglass frame and temple according to the invention.
Figure 6:
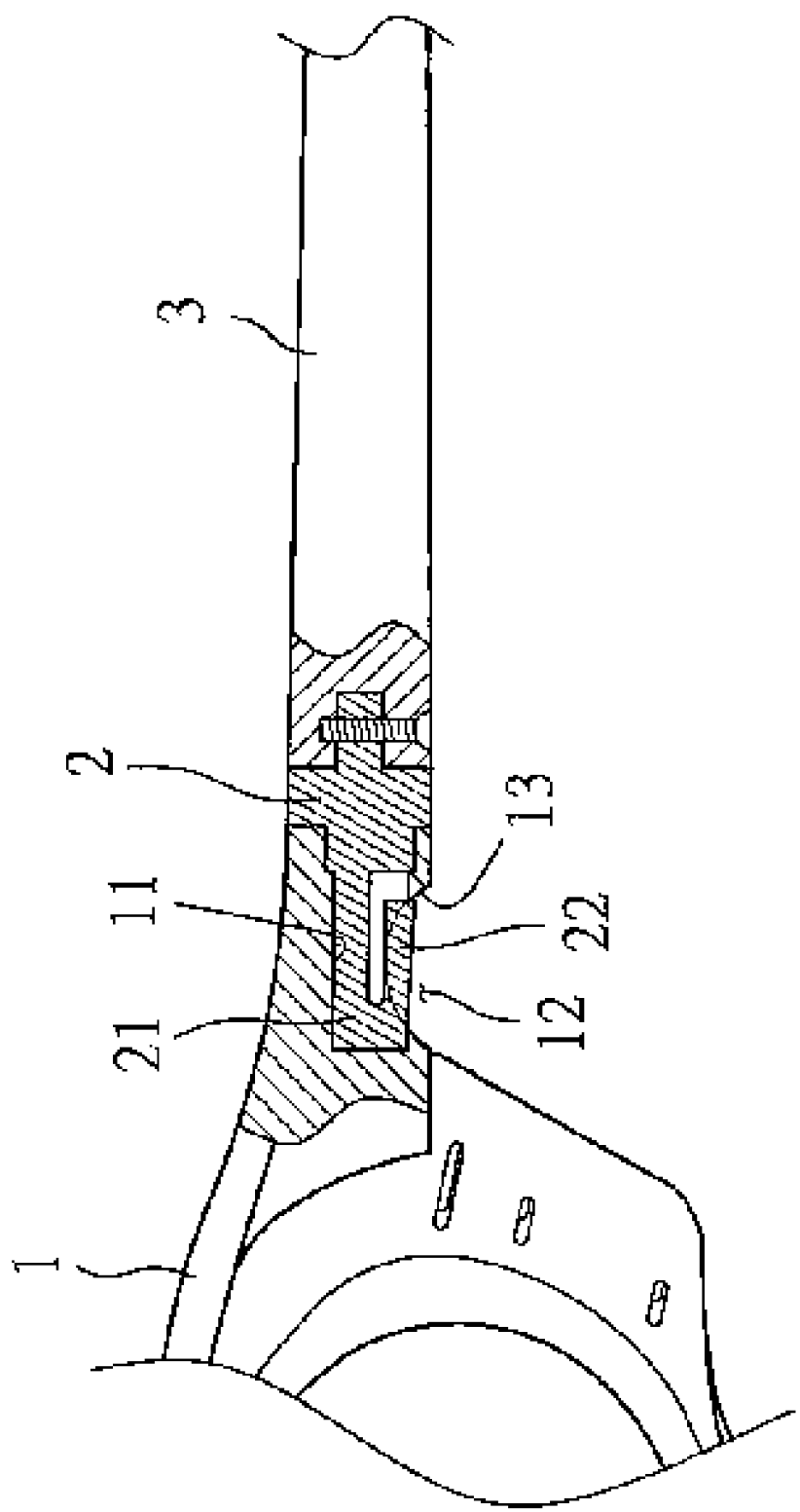
FIG. 6 is a sectional view of the eyeglass frame and the temple assembled by the connecting device shown in FIG. 5.

Referring to FIGS. 5 and 6, a preferred embodiment of the invention is shown. A frame 1 comprises a slot 111 at either endpiece, an opening 12 at the bottom of and in communication with the slot 11, and a projection 13 at an edge of the opening 12.

A connecting device 2 has its rear end secured to a temple 3 by screwing in a manner well known in the art. The connecting device 2 comprises a buckle 21 at the front dimensioned and shaped to fit snugly into the slot 11, the buckle 21 including a bottom release tab 22.

In assembly, as shown in FIG. 6, the buckle 21 of the connecting device 2 is locked into the slot 11 at the either end of the frame 1 so that the release tab 22 is disposed at the opening 12 and has its open end against the projection 13. That is, the frame 1 and the temple 3 are pivotably secured together by the connecting device 2. To unlock the assembly, the release tab 22 is pressed inwardly so that one end of the release tab 22 is disengaged with the projection 13 and then the connecting device 2 is pulled backward out of the slot 11.

Figure 7:
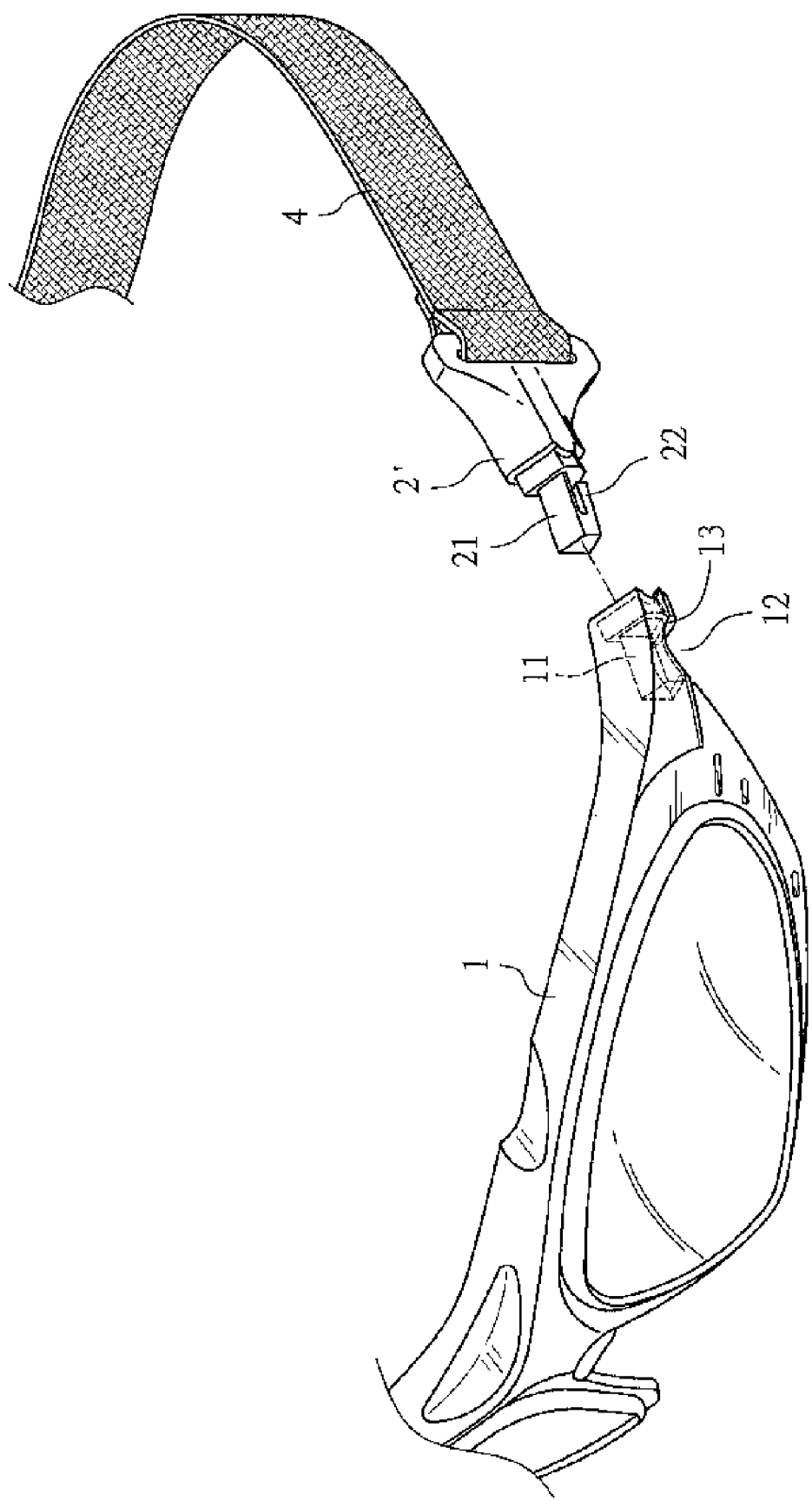
FIG. 7 is an exploded view of another preferred embodiment of connecting device for eyeglass frame and headband according to the invention.
Figure 8:
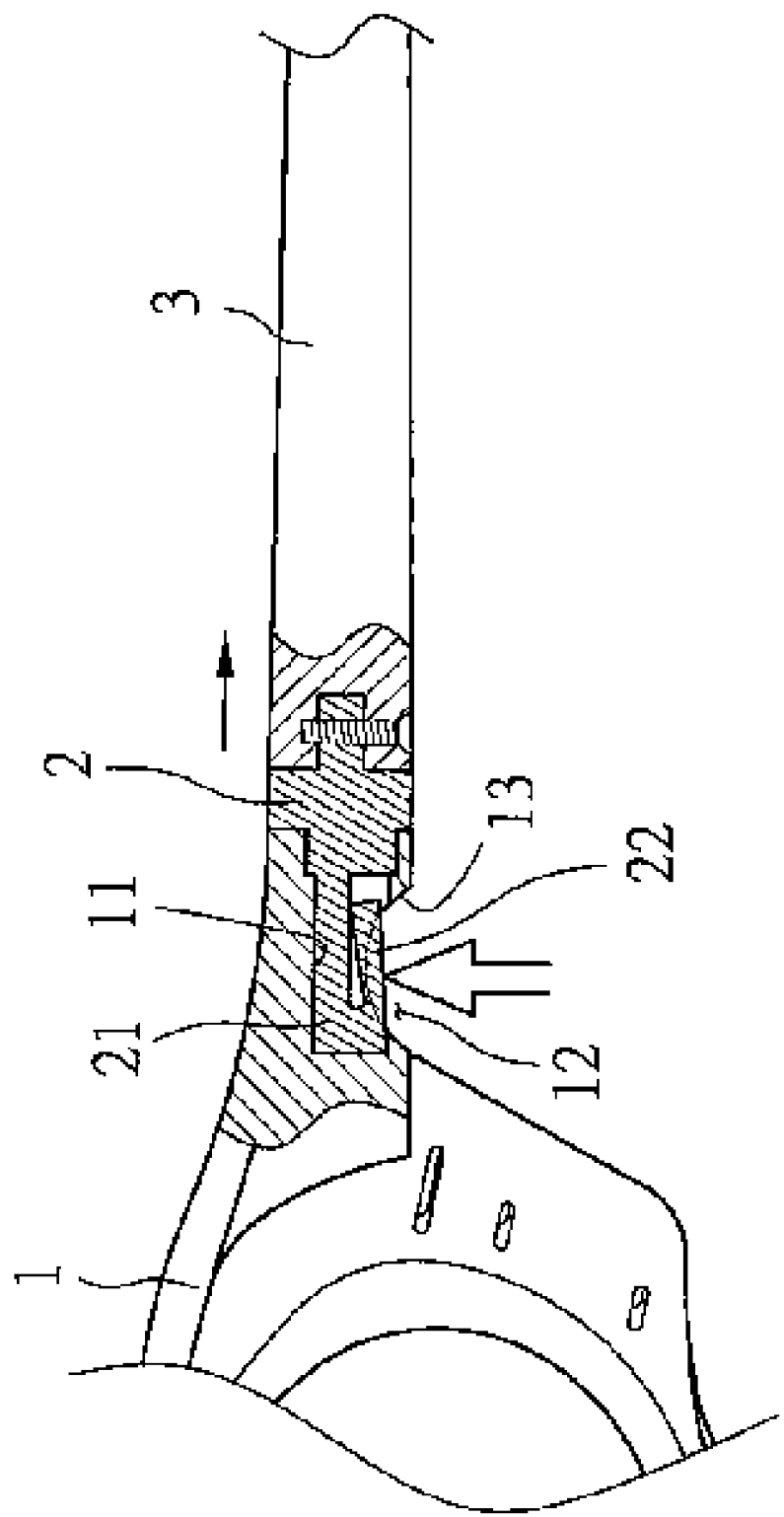
FIG. 8 is a sectional view of the eyeglass frame and the temple to be disassembled by pressing the latch and then pulling the connecting device out of the recess.

Referring to FIG. 7, another preferred embodiment of the invention is shown. A connecting device 2' is designed with its rear end secured to a headband 4 by tying a loop in a manner well known in the art and has a front end as described above with reference to the first embodiment.

While the invention herein disclosed has been described by means of specific embodiments, numerous modifications and variations could be made thereto by those skilled in the art without departing from the scope and spirit of the invention set forth in the claims.

What is claimed is:

1. A device for connecting an eyeglass frame and eyeglass temples or a headband, wherein:

a pair of slots is provided at both endpieces of the frame for receiving a connecting device respectively, each slot having an opening at the bottom of and in communication with the slot and a projection at an edge of the opening; each connecting device having a buckle at the front dimensioned and shaped to fit snugly into the slot and having a bottom release tab, the rear end of each connecting device being secured to a temple respectively by screwing.

2. A device for connecting an eyeglass frame and eyeglass temples or a headband as claim 1, wherein the rear end of each connecting device being secured to the headband.

* * * * *